(12) United States Patent
Koester et al.

(10) Patent No.: US 11,673,436 B2
(45) Date of Patent: Jun. 13, 2023

(54) STRUCTURES AND METHODS PROVIDING TREAD SENSOR INTEGRATION

(71) Applicant: Tyrata, Inc., Durham, NC (US)

(72) Inventors: David Alan Koester, Burlington, NC (US); James Barton Summers, III, Raleigh, NC (US)

(73) Assignee: TYRATA, INC., Durham, NC (US)

( * ) Notice: Subject to any disclaimer, the term of this patent is extended or adjusted under 35 U.S.C. 154(b) by 30 days.

(21) Appl. No.: 17/252,869

(22) PCT Filed: Jun. 25, 2019

(86) PCT No.: PCT/US2019/038872
§ 371 (c)(1),
(2) Date: Dec. 16, 2020

(87) PCT Pub. No.: WO2020/005863
PCT Pub. Date: Jan. 2, 2020

(65) Prior Publication Data
US 2021/0114419 A1    Apr. 22, 2021

Related U.S. Application Data

(60) Provisional application No. 62/691,948, filed on Jun. 29, 2018.

(51) Int. Cl.
*B60C 23/04* (2006.01)
*B60C 11/24* (2006.01)
(Continued)

(52) U.S. Cl.
CPC ........ *B60C 23/0493* (2013.01); *B60C 11/243* (2013.01); *B29C 45/14655* (2013.01);
(Continued)

(58) Field of Classification Search
CPC . B60C 23/0493; B60C 11/243; B60C 11/246; B60C 23/041; B60C 2019/004;
(Continued)

(56) References Cited

U.S. PATENT DOCUMENTS

| | | |
|---|---|---|
| 4,847,556 A | 7/1989 | Langley |
| 5,942,893 A | 8/1999 | Terpay |

(Continued)

FOREIGN PATENT DOCUMENTS

| | | |
|---|---|---|
| CN | 202641277 U | 1/2013 |
| CN | 102745025 B | 9/2014 |

(Continued)

OTHER PUBLICATIONS

European Search Report for European Patent Application No. 19826219.8, dated Sep. 22, 2021, 7 pages.

(Continued)

*Primary Examiner* — Eric Blount
(74) *Attorney, Agent, or Firm* — Sage Patent Group

(57) ABSTRACT

A tire monitoring system may include first and second sensor elements, a circuit board, and a housing. The circuit board includes control circuitry coupled with at least one of the first and second sensor elements, wherein the control circuitry is configured to generate tire tread information based on an electrical response of at least one of the first and second sensor elements. The housing includes a housing material that surrounds the circuit board in a direction parallel with respect to a surface of the circuit board. Related methods are also discussed.

20 Claims, 12 Drawing Sheets

(51) Int. Cl.
*B29C 45/14* (2006.01)
*B60C 19/00* (2006.01)
*G06K 19/07* (2006.01)
*H01Q 1/22* (2006.01)

(52) U.S. Cl.
CPC ........... *B60C 11/246* (2013.01); *B60C 23/041* (2013.01); *B60C 2019/004* (2013.01); *G06K 19/0702* (2013.01); *H01Q 1/2241* (2013.01)

(58) Field of Classification Search
CPC .......... B29C 45/14655; G06K 19/0702; H01Q 1/2241; G01L 17/00
USPC .................................................. 340/442, 447
See application file for complete search history.

(56) References Cited

U.S. PATENT DOCUMENTS

| | | | |
|---|---|---|---|
| 6,087,930 | A | 7/2000 | Kulka et al. |
| 6,883,962 | B2 | 4/2005 | Kurata |
| 6,959,592 | B2 | 11/2005 | Caretta |
| 6,963,273 | B2 | 11/2005 | O'brien et al. |
| 7,404,319 | B2 | 7/2008 | Poulbot et al. |
| 7,578,180 | B2 | 8/2009 | Lionetti et al. |
| 7,775,115 | B2 | 8/2010 | Theuss et al. |
| 7,814,781 | B2 | 10/2010 | Jongsma et al. |
| 8,047,068 | B2 | 11/2011 | Hamm et al. |
| 8,868,291 | B2 | 10/2014 | Mian et al. |
| 9,029,779 | B2 | 5/2015 | Estor et al. |
| 9,085,205 | B2 | 7/2015 | Son |
| 9,395,275 | B2 | 7/2016 | Boffa et al. |
| 9,797,703 | B2 | 10/2017 | Andrews et al. |
| 10,068,322 | B2 | 9/2018 | O'connor et al. |
| 10,113,855 | B2 | 10/2018 | Ledoux et al. |
| 2008/0065290 | A1* | 3/2008 | Breed .................... G01L 17/00 701/31.4 |
| 2009/0000370 | A1 | 1/2009 | Lionetti et al. |
| 2009/0222165 | A1 | 9/2009 | Krause et al. |
| 2009/0261962 | A1 | 10/2009 | Buck et al. |
| 2013/0311130 | A1 | 11/2013 | Horton et al. |
| 2016/0025585 | A1 | 1/2016 | Dammen et al. |
| 2016/0161243 | A1 | 6/2016 | Ledoux et al. |
| 2017/0124784 | A1 | 5/2017 | Wittmann et al. |
| 2017/0174014 | A1 | 6/2017 | Stewart et al. |
| 2017/0254634 | A1* | 9/2017 | Andrews ............... B60C 11/243 |
| 2017/0301103 | A1 | 10/2017 | Gonzaga et al. |
| 2017/0307349 | A1 | 10/2017 | Andrews et al. |
| 2017/0343337 | A1 | 11/2017 | Müller et al. |

FOREIGN PATENT DOCUMENTS

| | | |
|---|---|---|
| CN | 204632090 U | 9/2015 |
| CN | 105082888 A | 11/2015 |
| CN | 105445043 A | 3/2016 |
| CN | 106248402 A | 12/2016 |
| CN | 106290452 A | 1/2017 |
| CN | 206504877 U | 9/2017 |
| CN | 108088634 A | 5/2018 |
| CN | 207881647 U | 9/2018 |
| CN | 108717027 A | 10/2018 |
| DE | 10 2009 034334 A1 | 3/2010 |
| DE | 202014007378 U1 | 11/2014 |
| EP | 1394503 B1 | 8/2009 |
| EP | 3243671 A1 | 11/2017 |
| EP | 3265327 B1 | 10/2018 |
| FR | 2841826 B1 | 4/2005 |
| GB | 2555604 A | 5/2018 |
| JP | 4206952 B2 | 1/2009 |
| JP | 4905167 B2 | 3/2012 |
| JP | 2014-227125 A | 12/2014 |
| JP | 6231302 B2 | 11/2017 |
| JP | 6416769 B2 | 10/2018 |
| KR | 1019990054760 A | 7/1999 |
| KR | 1020000001076 A | 1/2000 |
| KR | 1020050043455 A | 5/2005 |
| KR | 100784278 B1 | 12/2007 |
| KR | 1020100048133 A | 5/2010 |
| KR | 101469714 B1 | 12/2014 |
| KR | 101556354 B1 | 9/2015 |
| KR | 1020150100438 A | 9/2015 |
| KR | 101905127 | 10/2018 |
| TW | M497599 U | 3/2015 |
| TW | 201527141 A | 7/2015 |
| TW | M506723 U | 8/2015 |
| TW | I562909 B | 12/2016 |
| TW | M547490 U | 8/2017 |
| TW | M558440 U | 4/2018 |
| WO | WO 2008061770 A1 | 5/2008 |
| WO | WO 2019/191246 | 10/2019 |
| WO | WO 2019/221879 | 11/2019 |
| WO | WO 2019/241118 | 12/2019 |
| WO | WO 2019/241368 | 12/2019 |
| WO | WO/2020/005863 | 1/2020 |
| WO | WO 2020/086698 | 4/2020 |
| WO | WO 2020/154145 | 7/2020 |

OTHER PUBLICATIONS

International Search Report and Written Opinion of the International Searching Authority, PCT/US2019/038872, dated Sep. 11, 2019, 8 pages.

* cited by examiner

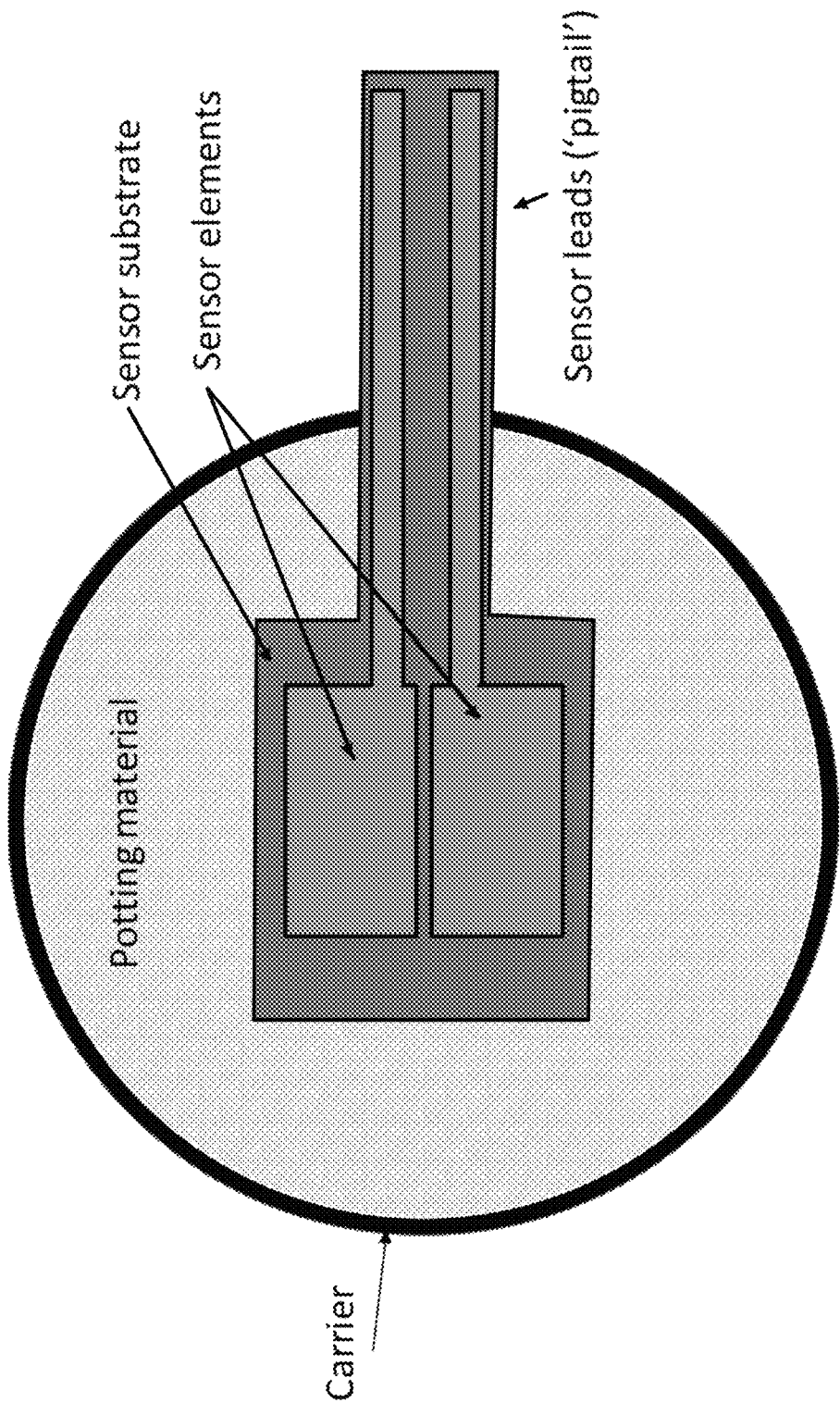

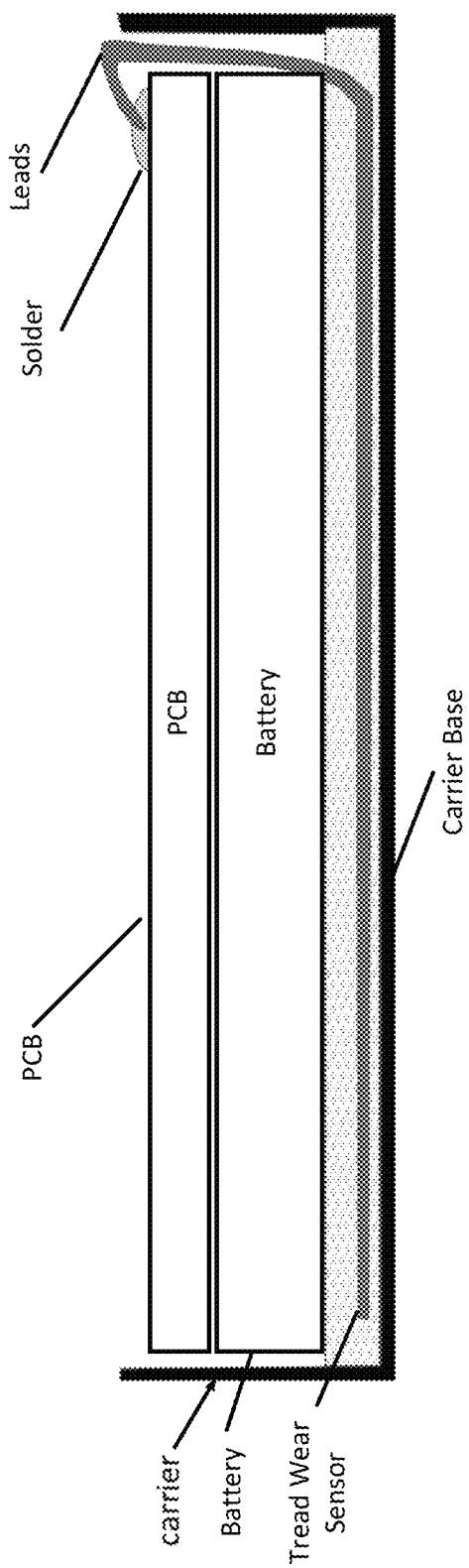

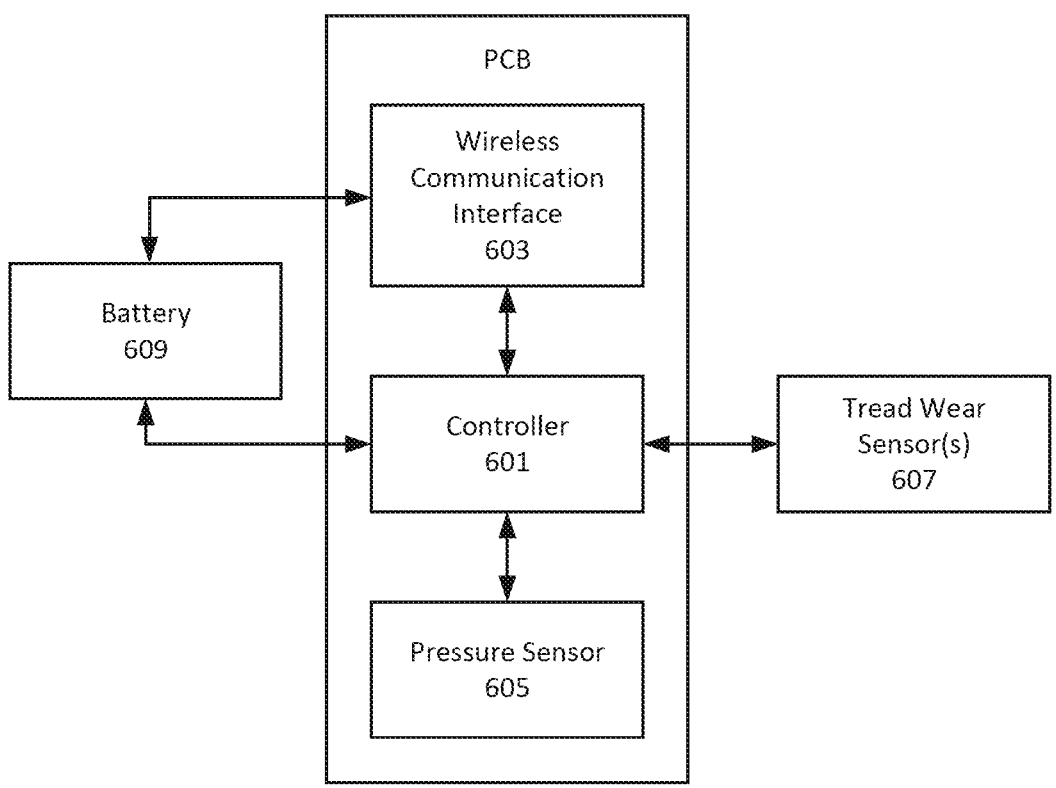

Custom PC Board

Sensor

Battery

Housing

Base                               Base

Cross sectional view of sensor housing including TMPS unit

Top and Bottom Views of the Sensor Housing of Figure 12

Cross sectional view of sensor housing that includes only the TTMS components

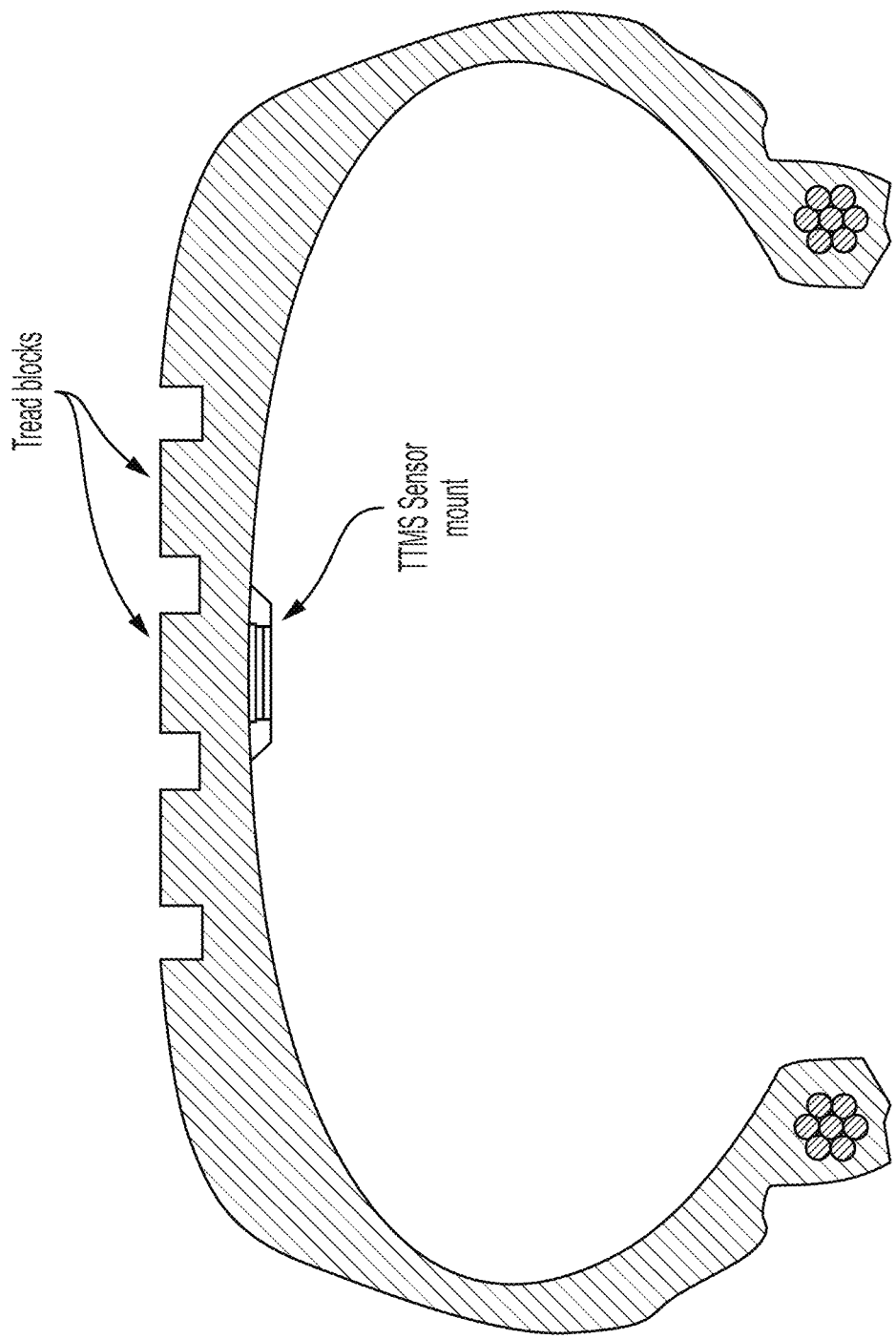

STRUCTURES AND METHODS PROVIDING TREAD SENSOR INTEGRATION

This application is a 35 U.S.C. § 371 national stage application of PCT International Application No. PCT/US2019/038872 filed on Jun. 25, 2019, which in turns claims domestic priority to U.S. Provisional Patent Application No. 62/691,948, filed on Jun. 29, 2018, the disclosures and content of which are incorporated by reference herein in their entirety.

TECHNICAL FIELD

The present disclosure relates generally to tires, and more particularly, to tire sensors and related methods.

BACKGROUND

Currently, tire pressure sensors may be provided in vehicle tires. Such sensors may be used to automatically monitor tire pressure, and a warning (e.g., a warning light) may be provided to the driver when low pressure is detected. Other aspects of the tire, however, may require manual monitoring and failure to adequately monitor such aspects may cause issues relating to safety. Accordingly, improved monitoring of vehicle tires may be desired.

SUMMARY

According to some embodiments of inventive concepts, a tire monitoring system may include first and second sensor elements, a circuit board, and a housing. The circuitry board may include control circuitry coupled with at least one of the first and second sensor elements, wherein the control circuitry is configured to generate tire tread information based on an electrical response of at least one of the first and second sensor elements. The housing may include a housing material that surrounds the circuit board in a direction parallel with respect to a surface of the circuit board.

According to some other embodiments of inventive concepts, a method may provide a tire monitoring system. First and second sensor elements may be provided, and a circuit board may be provided including control circuitry coupled with at least one of the first and second sensor elements. The control circuitry may be configured to generate tire tread information based on an electrical response of at least one of the first and second sensor elements. A housing may be formed on the circuit board using a housing material that surrounds the circuit board in a direction parallel with respect to a surface of the circuit board.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 4 to a top view of a tread wear sensor of FIG. 3 according to some embodiments of inventive concepts;

FIG. 5 is a cross-sectional/side view of a tread wear sensor mounted in the carrier of FIG. 1 with a battery and a printed circuit board according to some embodiments of inventive concepts;

FIG. 6 is a block diagram illustrating elements of a tire monitoring system according to some embodiments of inventive concepts;

FIG. 15 is a cross-sectional view of a sensor housing mounted on an inside surface of a tire according to some embodiments of inventive concepts.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1:
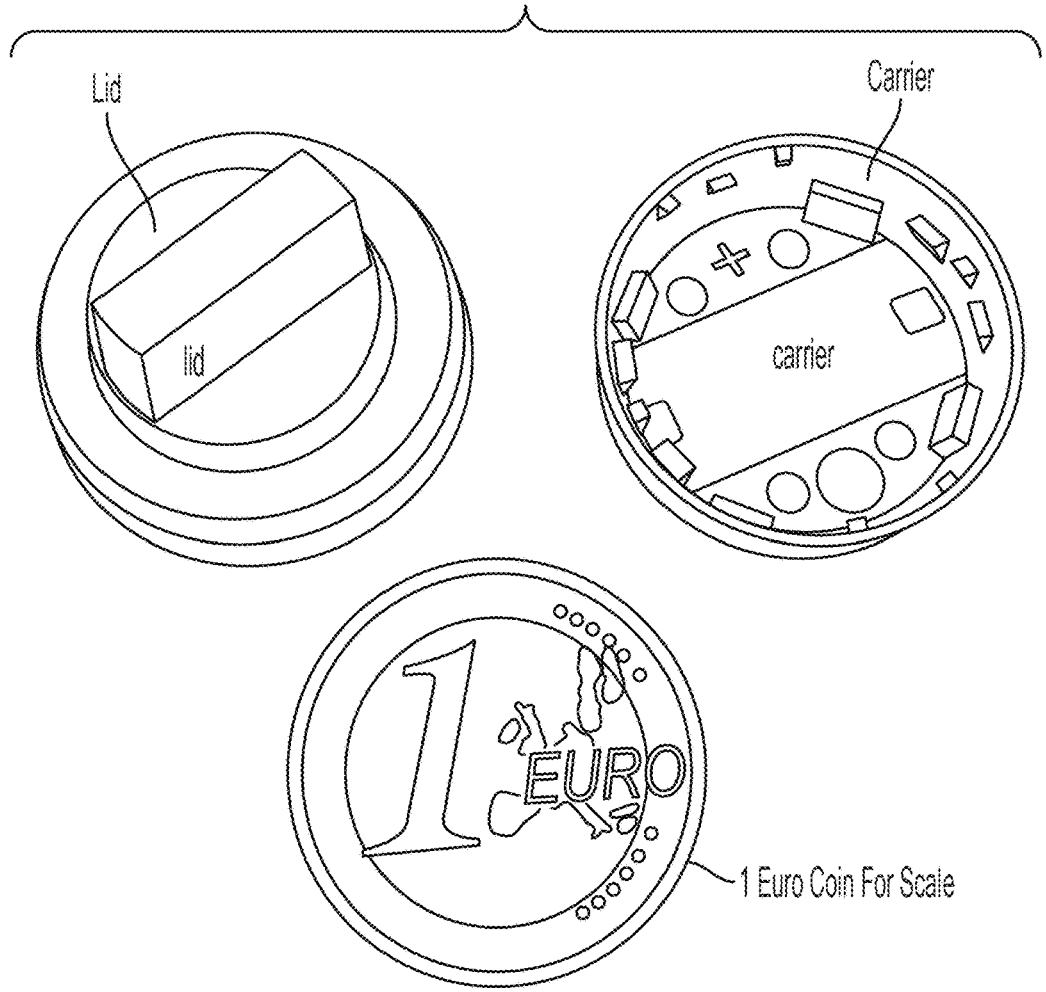
FIG. 1 is a photograph illustrating a lid and a carrier according to some embodiments of inventive concepts together with a 1 Euro coin provided to illustrate scale.

According to some embodiments of inventive concepts, tire tread monitoring systems (TTMS) may be used to monitor vehicle tire tread wear. A tire tread monitoring system according to such embodiments may use a sensor including two electrodes that may be formed, for example, by printing or other means on a rigid or flexible dielectric substrate. There may be different ways to package such tread wear sensors for tire deployment. One approach for Tire Pressure Monitoring Systems TPMS is a package scheme like the one presented by VDO (http://www.vdo.com/passenger-cars/tire-pressure-monitoring-systems-tpms/the-vdo-redi-sensor/). In this approach, the TPMS sensors, battery, sense electronics and RF communications are all housed inside a small carrier roughly 1 inch in diameter as shown in FIG. 1 including a carrier and a lid. The lid is placed over the contents of the carrier and sealed, and this "package" is then placed inside a rubber mount (shown in FIG. 2) that is attached to the inside surface of the tire by an adhesive. The base of the package carrier may thus be mounted adjacent to the inside surface of the tire. According to some embodiments of inventive concepts, a tread wear sensor may be mounted in the same carrier and share the power management and RF communications hardware used for TPMS. According to some embodiments of inventive concepts, methods may be provided to integrate tire tread wear and pressure monitoring systems. U.S. Provisional Patent Application No. 62/650,714 ("Structures and Methods Providing Sensor-Package Integration") discusses integration of a tread sensor into a standard tire pressure monitoring system (TPMS) style package similar to that described by VDO. The disclosure of U.S. Provisional App. No. 62/650,714 is hereby incorporated herein in its entirety by reference.

Tread wear sensor structures/designs and methods according to some embodiments disclosed herein may enable integration with a tire pressure monitor into a carrier/package.

According to some embodiments, the tread wear sensor may be placed at the base of the carrier (also referred to as the bottom of the carrier) to position the sensor close to the inner tire surface. In some TPMS designs, the battery may be placed at the bottom of the carrier. According to some embodiments, the tread wear sensor (e.g., the tread wear sensor elements) may be positioned between the battery and a base of the carrier. This design may position the tread wear sensor close to the tire surface (e.g., as close as possible) and may reduce/avoid RF (radio frequency) interference from the battery and/or electronics in the package. According to some embodiments, an epoxy or similar underfill or potting material may be used underneath and/or above the tread wear sensor to secure the tread wear sensor. In addition, this underfill/potting material may protect the tread wear sensor from harsh operating conditions including varying humidity and/or mechanical shock/vibration. The orientation of the tread wear sensor could be either upward facing or downward facing.

Figure 3:
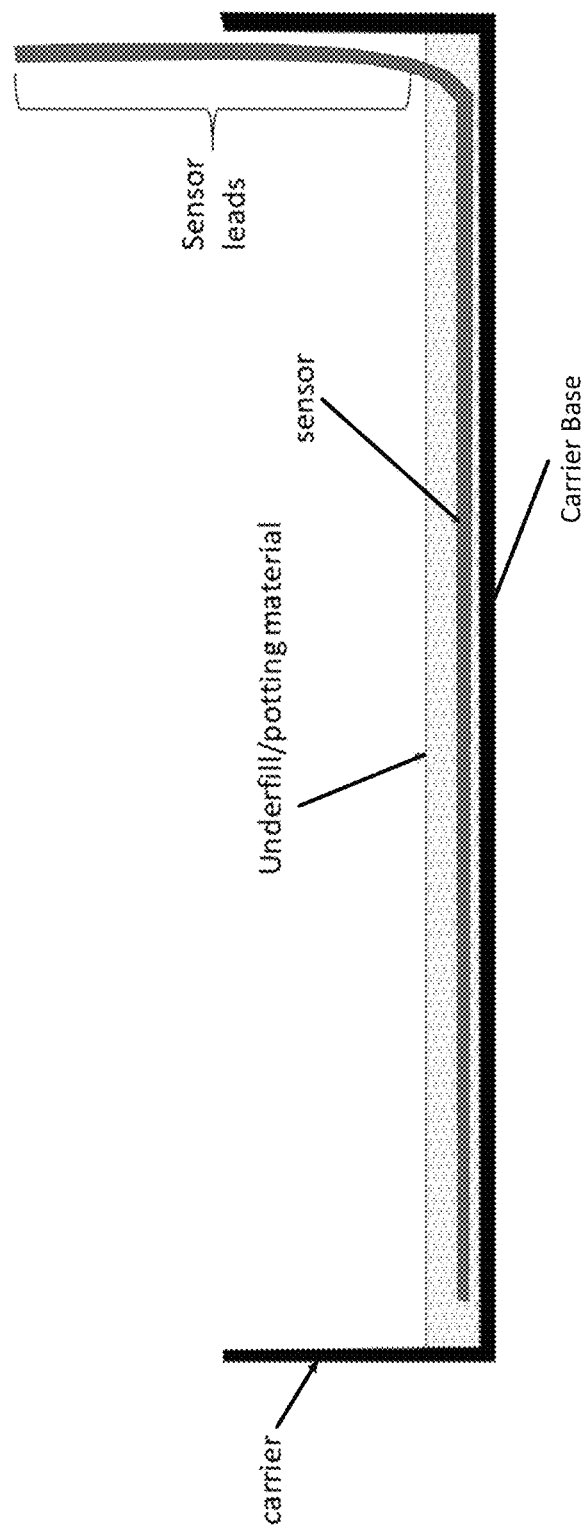
FIG. 3 is a cross-sectional/side view of a tread wear sensor mounted inside a carrier of FIG. 1 according to some embodiments of inventive concepts.

FIG. 3 is a cross-sectional/side view of a tread wear sensor (labeled "sensor") mounted inside the carrier of FIG. 1. As shown, the tread wear sensor may be provided adjacent a base of the carrier, and an underfill/potting material may be provided on the tread wear sensor. Moreover, sensor leads (e.g., pigtail sensor leads) from the sensor may extend through the underfill/potting material to provide electrical coupling with control circuitry. FIG. 4 is a top view of the tread wear sensor of FIG. 3 in the carrier. For purposes of illustration, the tread wear sensor is shown through the underfill/potting material in FIG. 4, but it will be understood that the underfill/potting material may cover the tread wear sensor (except for the pigtail sensor leads).

FIG. 5 is a cross-sectional/side view of the tread wear sensor mounted inside the carrier of FIG. 1 with a battery and printed circuit board PCB. The pigtail sensor leads ("leads") of the tread wear sensor may extend out of the carrier and may wrap around the battery and printed circuit board PCB. The leads of the tread wear sensor may then be attached to the PCB by soldering (surface mount technology), conductive epoxy, or by a connector or socket. It may be useful to include additional dielectric shielding (not shown in FIG. 5) between the battery and the tread wear sensor. According to some embodiments, the underfill/potting material may provide adequate dielectric shielding, but in other embodiments, different/additional layers may be added.

Additional modifications to the tread wear sensor may further facilitate integration with the tire pressure monitor in the final package. According to some embodiments, the tread wear sensor may be encapsulated by applying a thin Kapton, PET (polyethylene terephthalate), or other layer over the top surface of the tread wear sensor after printing. This encapsulation may extend down the length of the leads but leave exposed the ends of the leads for subsequent electrical connection. Metal vias or feedthroughs may be provided in the tread wear sensor substrate (e.g., Kapton), particularly at the ends of the leads to improve subsequent electrical connection. These metal vias/feedthroughs may allow electrical and mechanical interface to the printed traces from either the top or bottom side of the sensor substrate. This may provide a thick, mechanically robust metal layer for connection either by solder, conductive epoxies or socket connectors, allowing for electrical connection from either side of the substrate. In addition, a metal layer may be provided on the backside of the sensor substrate (away from the carrier base and the tire surface) to provide an effective RF ground plane. This ground plane layer may be continuous or discontinuous based on RF characteristics of the sensor.

According to some embodiments, the sensor elements may be provided on a flexible sensor substrate, and mounted so that the sensor elements are between the flexible sensor substrate and the carrier base, and so that the sensor elements are between the flexible sensor substrate and the inner surface of the tire. Moreover, a metal layer may be provided (e.g., as an RF ground plane) on the backside of the sensor substrate so that the sensor substrate is between the metal layer and the sensor elements. In such embodiments, the sensor elements may be between the backside metal layer and the carrier base, and between the backside metal layer and the inner surface of the tire.

A lid (e.g., as shown in FIG. 1) may be provided over the carrier of FIG. 5 to seal the tread wear sensor, battery, and PCB within the carrier/lid package, and the carrier base may be mounted on an inside surface of the tire to be monitored. The structure of FIG. 5 may thus be used to provide an integrated tread wear sensor and pressure monitor. While one PCB is shown in FIG. 5 for purposes of illustration, control circuitry may be provided using one or a plurality of PCBs. Moreover, a pressure sensor (e.g., a micro-electromechanical-system MEMS pressure sensor) may be provided (inside the carrier/lid package) with the PCB (e.g., mounted on the PCB) to provide tire pressure monitoring. Components of the integrated tire monitoring system are illustrated in the block diagram of FIG. 6.

As shown in FIG. 6, circuitry may be provided in/on the printed circuit board to provide controller 601, wireless interface 603, and/or pressure sensor 605. Controller 601 and/or wireless interface 603 may be implemented using one or more integrated circuit devices that may be mounted (soldered) on PCB (or otherwise coupled with PCB). Moreover, pressure sensor 605 may be a MEMS pressure sensor that is provided as a discrete device on/in the PCB, and/or pressure sensor 605 may be integrated with circuits used to provide controller 601 and/or wireless interface 603. As shown in FIG. 5, battery 609 may be positioned between the PCB and tread wear sensor 607 in the carrier, with the tread wear sensor positioned between battery 609 and the base of the carrier (which is mounted to the inside surface of the tire).

Controller 601 (also referred to as a control circuit or control circuitry) may thus generate tire pressure information based on signals received from pressure sensor 605, and controller 601 may thus generate tread wear information based on signals received from tread wear sensor 607. The tire pressure information and/or tread wear information may thus be transmitted through wireless communication interface 603 (also referred to as a wireless interface circuit or wireless interface circuitry) to a receiver in the vehicle that provides the information to a controller in the vehicle. The wireless interface 603 may thus provide wireless communication (e.g., radio communication) with a receiver in the vehicle to facilitate wireless transmission of tire pressure and/or tread wear information from the spinning tire to the vehicle controller. The wireless interface 603 may also receive information (e.g., instructions) from a transmitter in the vehicle, such as instructions to transmit tire pressure and/or tread wear information. While pressure and tire wear sensors are discussed by way of example, other sensors (e.g., a temperature sensor) may also be included in the tire monitoring system. With a temperature sensor, for example, controller 601 may generate tire temperature information based on signals received from the temperature sensor, and controller 601 may transmit such temperature information through wireless communication interface 603 to the receiver in the vehicle.

Operations of the tire monitoring system may be performed by controller 601 and/or wireless communication interface 603. For example, controller 601 may control wireless communication interface 603 to transmit communications (e.g., tread wear and/or tire pressure information) through wireless communication interface 603 over a radio interface to a vehicle receiver and/or to receive communications (e.g., requests for information) through wireless communication interface 603 from a vehicle transmitter over a radio interface. Moreover, modules may be stored in memory, and these modules may provide instructions so that when instructions of a module are executed by controller 601, controller 601 performs respective operations (e.g., operations discussed below with respect to the claims).

Figure 7A:
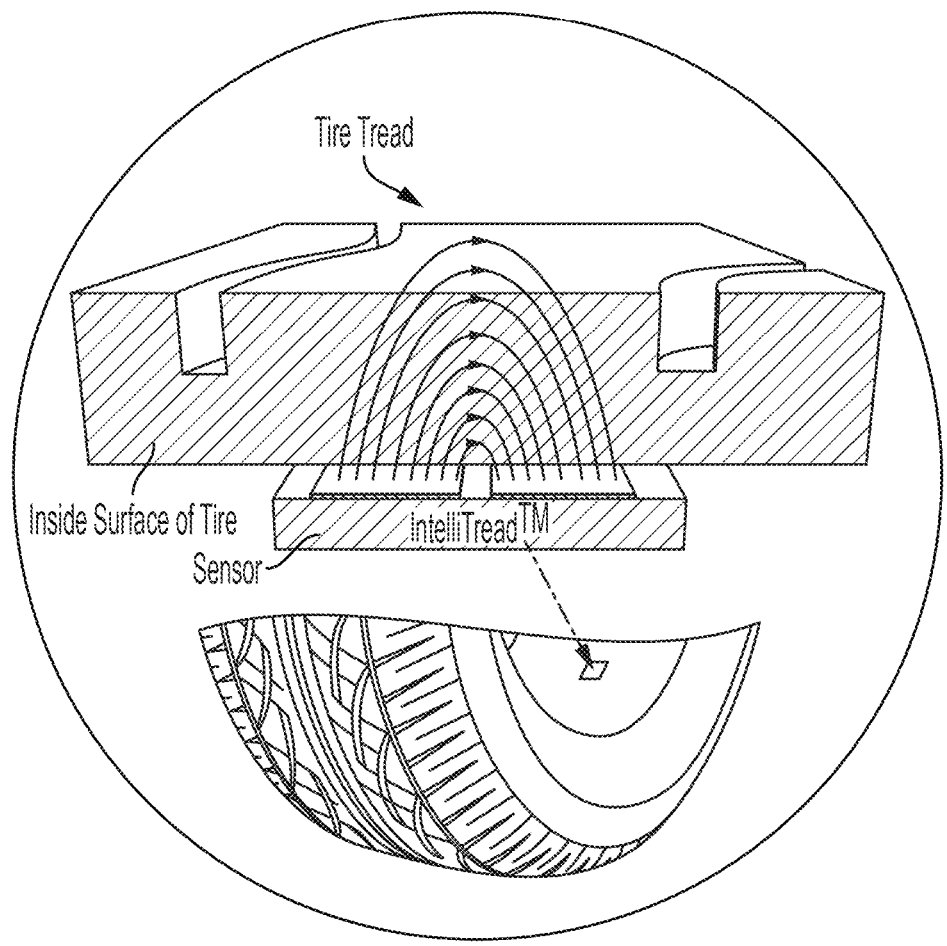
FIGS. 7A and 7B are schematic diagrams illustrating operation of a tread wear sensor according to some embodiments of inventive concepts.
Figure 7B:
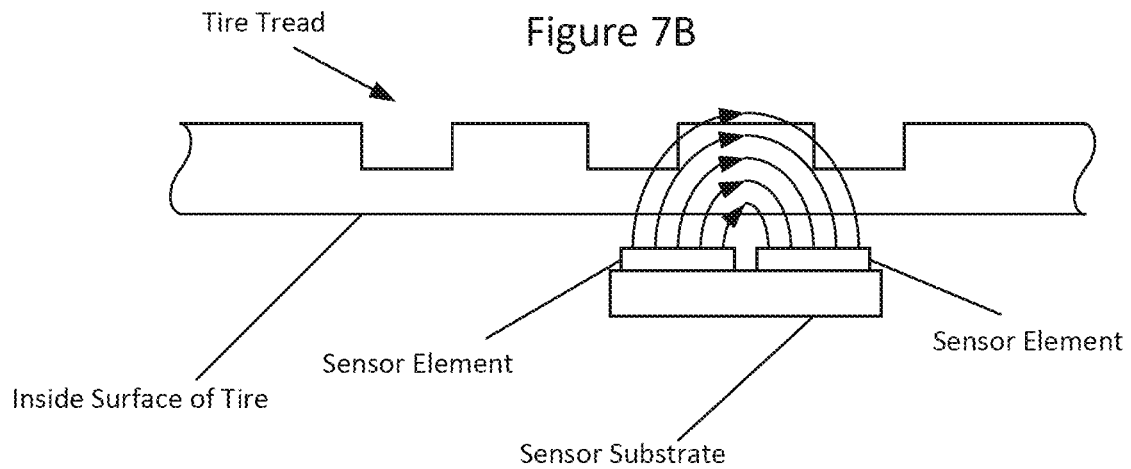

FIGS. 7A and 7B are schematic diagrams illustrating operation of a tread wear sensor according to some embodiments of inventive concepts. In the illustration of FIGS. 7A and 7B, the tread wear sensor is shown on an inside surface of the tire without the other elements of FIGS. 5/6 to more clearly illustrate operations thereof. Operation of the tread wear sensor is based on the mechanics of how electric fields interact with different materials. As shown in FIGS. 4 and 7B, the tread wear sensor (TWS) includes two electrically conductive sensor elements (also referred to as sensor electrodes) side-by-side and very close to each other, and the two sensor elements are positioned adjacent to the inside of the tire as shown in FIGS. 7A and 7B. As shown in FIG. 5, the carrier base may be between the sensor elements and the inside surface of the tire, but the carrier has been omitted from FIGS. 7A and 7B for each of illustration.

The controller 601 may thus apply an oscillating electrical voltage to one of the sensor elements while the other sensor element is grounded to generate an electrical field between the two sensor elements (shown as arcs in FIGS. 7A and 7B). While most of the electric field may pass directly between edges of the sensor elements, some of the electric field arcs from the face of one electrode to the face of the other electrode through the tire tread (shown by arcs in FIGS. 7A and 7B). The tire rubber and tread structure interfere with this "fringing field," and by measuring this interference through the electrical response of the grounded sensor element, the controller 601 may thus determine a thickness of the tire above the tread wear sensor.

Figure 2:
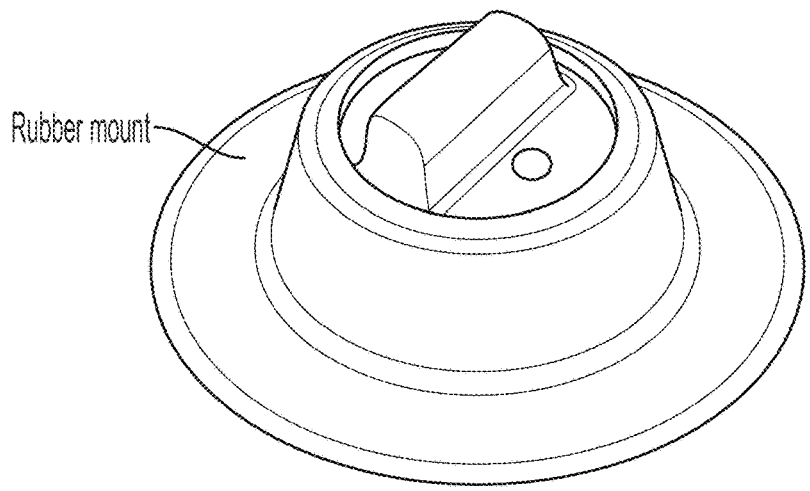
FIG. 2 is a photograph illustrating a rubber mount according to some embodiments of inventive concepts.
Figure 8:
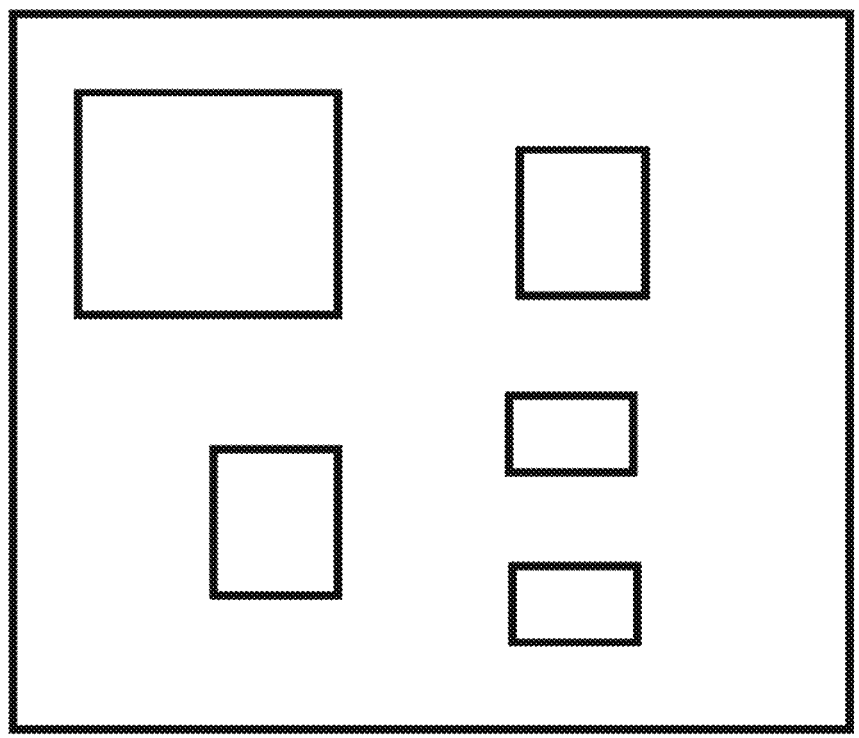
FIG. 8 illustrates a printed circuit board PCB that may be used according to some embodiments of inventive concepts.

According to further embodiments of the present disclosure, a modification of the above disclosed integration scheme is presented where the tread sensor (also referred to as a tread wear sensor), it's associated electronics, battery and communications chips are molded inside a rubber mount having outer dimensions similar to those shown in the "boot" of FIG. 2, instead of placing the sensor inside a plastic housing including a lid and carrier of FIG. 1. Aspects of such embodiments are discussed below:

A custom Printed Circuit PC Board is illustrated in FIG. 8 according to some embodiments of inventive concepts. The custom PC board may include source electronic signal and sense, computation, RF data transmission and power management circuitry. Such circuitry may be provided using one or more discrete and/or integrated circuit (IC) electronic devices interconnected using conductive traces of the PC board. The PCB of FIG. 8 may provide circuitry as discussed above with respect to PCB of FIG. 5 and/or controller 601 of FIG. 6.

Figure 9:
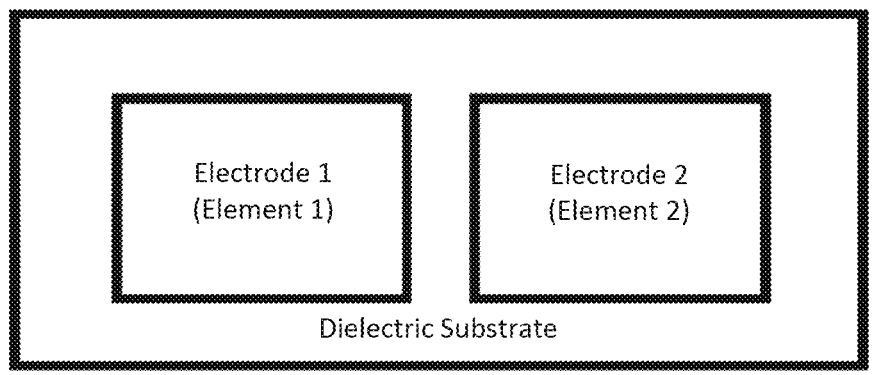
FIG. 9 illustrates a dielectric substrate that may be used according to some embodiments of inventive concepts.

The sensor is illustrated in FIG. 9 according to some embodiments of inventive concepts. The sensor interfaces with the tire and is electrically connected to the PCB of FIG. 8. As shown, the sensor includes two electrodes (Electrode 1 and Electrode 2) on a dielectric substrate, and the sensor may be mounted on an inside surface of the tire (opposite a tread block) so that the electrodes are between the dielectric substrate and the inside surface of the tire. The sensor (e.g., tread wear sensor or a tread monitoring sensor) of FIG. 9 may be provided using structures as discussed above, for example, with respect to FIGS. 3, 4, 5, 6, 7A, and/or 7B.

Figure 10:
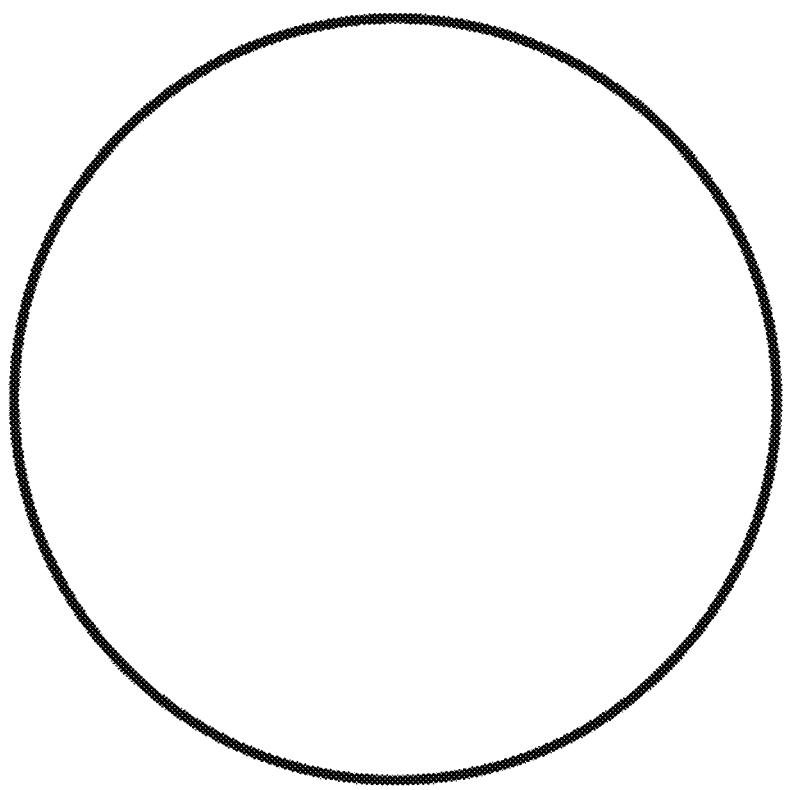
FIG. 10 illustrates a battery that may be used according to some embodiments of inventive concepts.

The battery of FIG. 10 may be a coin style battery according to some embodiments of inventive concepts. The power source for the sensor may be a coin cell battery but could be another stored energy device. The battery of FIG. 10 may be used as discussed above with respect to the battery of FIGS. 5 and 6.

Figure 11:
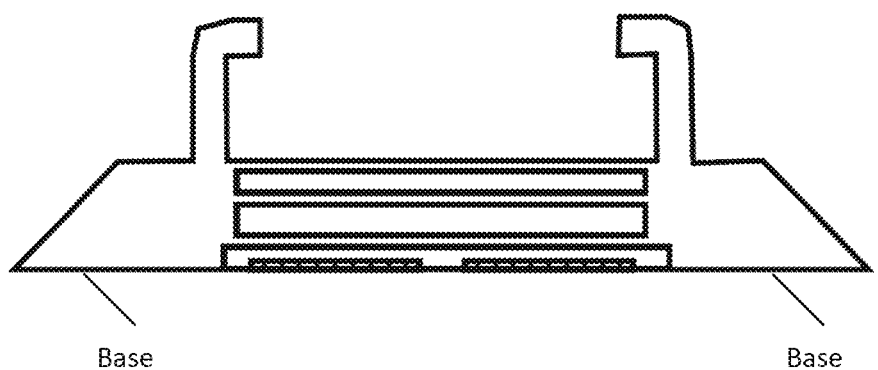
FIG. 11 illustrates a housing that may be used according to some embodiments of inventive concepts.
Figure 12:
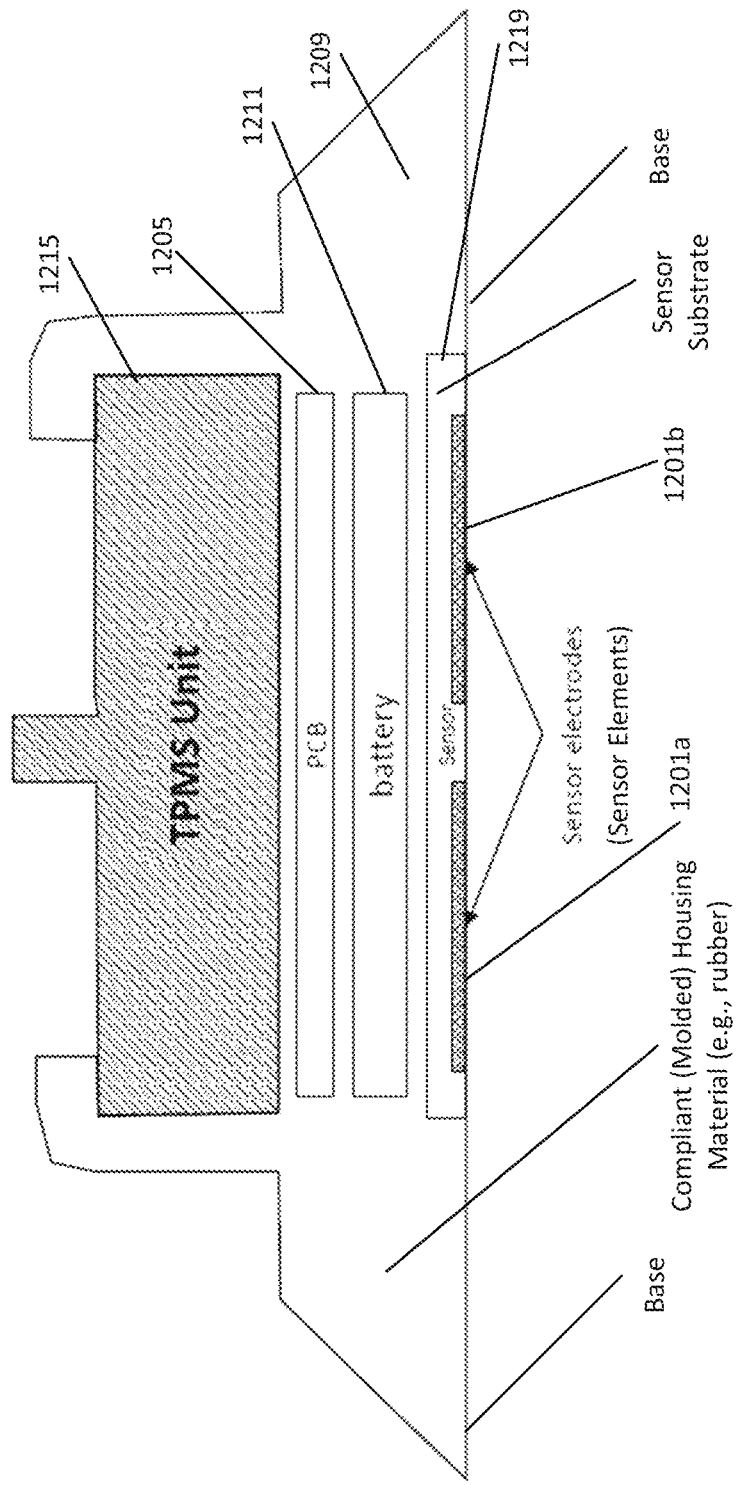
FIG. 12 is a cross-sectional view of a sensor housing including a tire pressure monitoring system according to some embodiments of inventive concepts.
Figure 13:
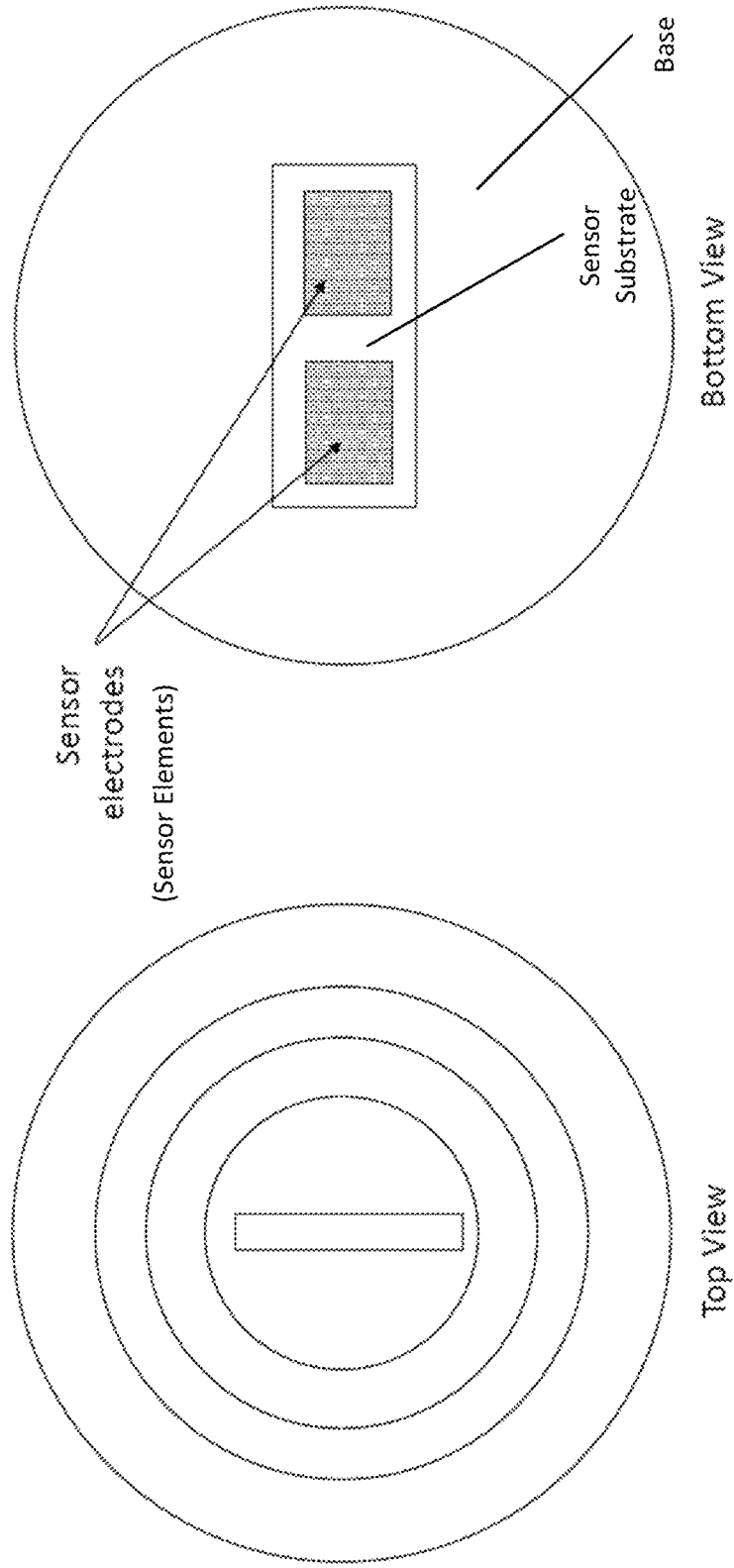
FIG. 13 illustrates top and bottom views of the sensor housing of FIG. 12 according to some embodiments of inventive concepts.

A rubber housing or "boot" according to some embodiments of inventive concepts is illustrated in FIGS. 11, 12, 13 and/or 14. The housing may be a rubber housing specific to the tread sensor components of FIGS. 8-10, the rubber housing may be a shared housing for a TPMS system as shown in FIGS. 1-2, and/or the rubber housing may be made of compliant materials other than rubber.

Figure 14:
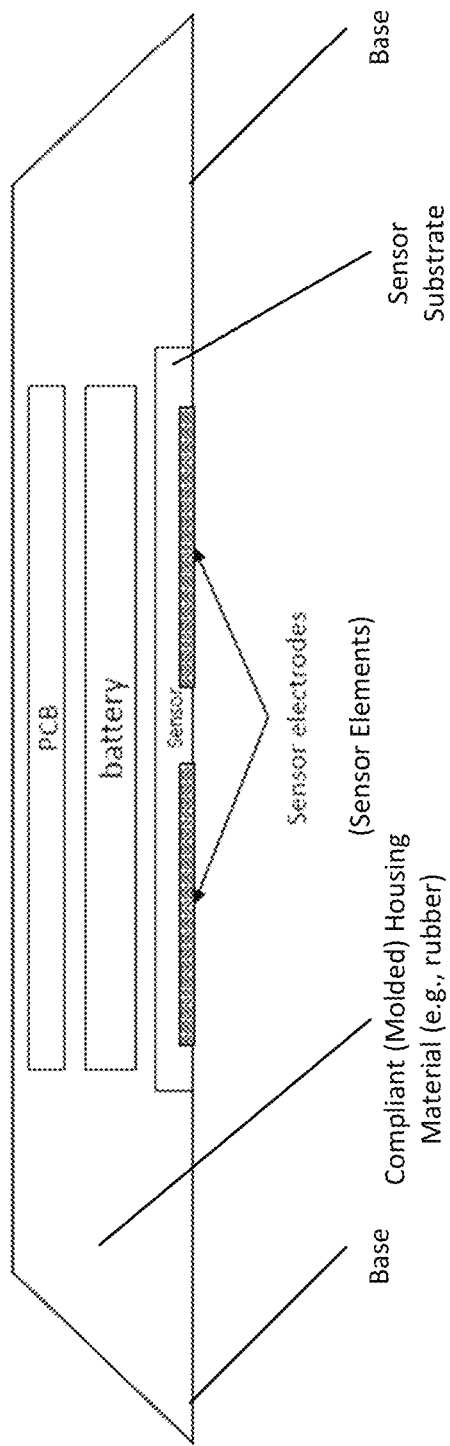
FIG. 14 is a cross-sectional view illustrating a sensor housing according to some embodiments of inventive concepts.

According to some embodiments of inventive concepts, a tire tread monitoring system (TTMS) may be mounted and/or encased inside a rubber housing (housing) or "boot." The components encased in the housing may include the sensor, a battery and a PCB that includes circuitry for sensor drive and sense, power management and RF communication. The PCB may also include temperature, humidity, and/or pressure sensors. In embodiments of FIGS. 12 and 13, the sensor electrodes may be encased flush with the surface of the housing such that the sensor electrodes directly contact the tire surface upon mounting. In other embodiments, the electrodes might be fully encased in the housing and not directly in contact with the tire surface. As also shown in FIG. 12, the battery may be mounted directly above the sensor and below the PCB. In another embodiment, the battery may by mounted above the PCB or to the side depending on the battery size and shape. FIG. 13 shows top and bottom views of the housing with the TPMS unit installed. FIG. 14 shows a cross section of some embodiments that do not include a TPMS unit.

In some illustrated embodiments, the housing may also provide a housing for a tire pressure monitoring sensor (TPMS). In other embodiments, there may be no TPMS and the housing may house only the tire tread sensor elements. In FIG. 13, the housing is shown to have a round shape but the shape may vary depending on sizes and shapes of tire tread sensor components.

According to some embodiments, the TTMS may measure tire tread and transmit tread data via Radio Frequency RF signaling outside the tire to an RF receiver. The RF receiver could be a component of a vehicle or a stand-alone mobile receiver. In some other embodiments, the TTMS may transmit data directly to the integrated TPMS system whereby the TPMS system collects the tread data, and retransmits the data to either a vehicle mounted receiver or mobile device, so that the TPMS system acts as a repeater. The TPMS system may simply act as a repeater or may collect the data, compile it with pressure and/or temperature data and transmit it to either a vehicle mounted receiver or mobile device.

FIG. 12 is a cross sectional view of a sensor housing including a TPMS unit according to some embodiments. FIG. 13 provides top and bottom views of the sensor housing of FIG. 6 including a TPMS unit according to some embodiments. FIG. 14 is a cross sectional view of a sensor housing that includes only the TTMS components (without TPMS components) according to some embodiments. FIG. 15 is a cross sectional view of a sensor housing mounted inside a tire according to some embodiments.

The housing of FIG. 12 may be formed by molding the housing material on/around the PCB, the battery, and/or the sensor (including sensor substrate and sensor electrodes). As shown, the housing material may extend between portions of the PCB and battery, between portions of the battery and the sensor, and/or between portions of the PCB and sensor. According to some other embodiments, the PCB, the battery, and/or the sensor may be bonded before forming the housing. For example, a bonding material (different than the housing material) may be used to bond the PCB, the battery, and/or the sensor, and then a molding process (e.g., an injection molding process) may be used to form the housing (also referred to as a boot).

As shown, the housing may include a recess to accept a tire pressure monitoring system TPMS (or portions thereof) that may be provided after forming the housing. A wireless communicative coupling may be provided between the TPMS and the PCB, or an electrical coupling may be provided through the housing between the TPMS and the PCB. With an electrical coupling, for example, a wireless communication interface of TPMS may be used to transmit tread wear information generated by PCB, and/or power may be provided from TPMS to PCB so that a battery is not required in the housing. According to some other embodiments, TPMS, a wireless interface, and/or a power source may be provided separate from the housing, and an electrical coupling with the PCB may be provided through the housing.

The tire monitoring system of FIG. 12 may thus include first and second sensor elements 1201*a* and 1201*b*, a printed circuit board PCB 1205, and a housing 1209. The circuit board 1205 may include control circuitry coupled with at least one of the first and second sensor elements 1201*a* and/or 1201*b*, where the control circuitry is configured to generate tire tread information based on an electrical response of at least one of the first and second sensor elements.

The housing 1209 may include a housing material that surrounds the printed circuit board 1205 in a direction parallel with respect to a surface of the circuit board. The housing material, for example, may be a compliant housing material, such as rubber, and the housing material may be molded around the printed circuit board 1205.

In addition, a power source 1211 (e.g., a battery) may be coupled with the printed circuit board, wherein the housing material surrounds the power source (e.g., battery) in the direction parallel with respect to the surface of the printed circuit board 1205. The power source may be between the printed circuit board 1205 and at least one of the first and second sensor elements 1201*a* and/or 1201*b*.

According to some embodiments, the housing material of housing 1209 may define a base adapted to provide an interface with an inside surface of a tire, and respective surfaces of the first and second sensor elements 1201*a* and 1201*b* may be exposed through the base of the housing material. According to some other embodiments, the housing material may define a base adapted to provide an interface with an inside surface of a tire, and respective surfaces of the first and second sensor elements 1201*a* and 1201*b* adjacent the base may be covered by the housing material.

A wireless communication interface may be provided on the printed circuit board 1205, and the wireless communication interface may be coupled with control circuitry on the printed circuit board 1205. The wireless communication interface may be configured to wirelessly transmit the tread wear information to a remote receiver. For example, at a least portion of the control circuitry and/or at least a portion of the wireless communication interface may be provided using one or more integrated circuit electronic devices mounted on the printed circuit board 1205.

A pressure sensor may also be coupled with the control circuitry, wherein the control circuitry is configured to generate tire pressure information based on an electrical response of the pressure sensor, and wherein the wireless communication interface is configured to wirelessly transmit the tire pressure information to the remote receiver. The pressure sensor, for example, may be provided as a MEMS based pressure sensor on printed circuit board 1205 and/or in TPMS unit 1215.

As shown, sensor elements 1201*a* and 1201*b* may be provided on a dielectric sensor substrate 1219, and the housing material and a material of the dielectric sensor substrate may be different. Moreover, at least a portion of the dielectric sensor substrate 1219 may be between the printed circuit board 1205 and at least one of the first and second sensor elements 1201*a* and/or 1201*b*. As discussed with respect to FIGS. 4 and 5, first and second leads may extend through the housing material, wherein the first lead provides electrical coupling between the first sensor element 1201*a* and the printed circuit board 1205, and wherein the second lead provides electrical coupling between the second sensor element 1201*b* and the printed circuit board 1205.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

The dimensions of elements in the drawings may be exaggerated for the sake of clarity. Further, it will be understood that when an element is referred to as being "on" another element, the element may be directly on the other element, or there may be an intervening element therebetween. Moreover, terms such as "top," "bottom," "upper," "lower," "above," "below," and the like are used herein to describe the relative positions of elements or features as shown in the figures. For example, when an upper part of a drawing is referred to as a "top" and a lower part of a drawing is referred to as a "bottom" for the sake of convenience, in practice, the "top" may also be called a "bottom" and the "bottom" may also be a "top" without departing from the teachings of the inventive concept (e.g., if the structure is rotate 180 degrees relative to the orientation of the figure).

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor (also referred to as a controller) such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following claims and their equivalents, and shall not be restricted or limited by the foregoing detailed description.

The invention claimed is:

1. A tire monitoring system comprising:
a first sensor element;
a second sensor element;
a circuit board including control circuitry coupled with at least one of the first sensor element and the second sensor element, the control circuitry being configured to generate tire tread information based on an electrical response of at least one of the first sensor element and the second sensor element; and a housing comprising a housing material that surrounds the circuit board in a direction parallel with respect to a surface of the circuit board, the housing material being molded on and/or around the first sensor element, the second sensor element, and the circuit board.

2. The tire monitoring system of claim 1, wherein the housing material comprises a compliant housing material.

3. The tire monitoring system of claim 2, wherein the housing material comprises rubber.

4. The tire monitoring system of claim 1, wherein the housing material comprises a molded housing material.

5. The tire monitoring system of claim 4, further comprising:
a dielectric sensor substrate,
wherein the first sensor element and the second sensor element are provided on the dielectric sensor substrate,
wherein the housing material and a material of the dielectric sensor substrate are different, and
wherein at least a portion of the dielectric sensor substrate is between the circuit board and at least one of the first sensor element and the second sensor element.

6. The tire monitoring system of claim 1 further comprising:
a power source electrically coupled with the circuit board,
wherein the housing material surrounds the power source in the direction parallel with respect to the surface of the circuit board.

7. The tire monitoring system of claim 6, wherein the power source is between the circuit board and at least one of the first sensor element and the second sensor element.

8. The tire monitoring system of claim 6, wherein the power source comprises a battery.

9. The tire monitoring system of claim 1, wherein the housing material defines a base adapted to provide an interface with an inside surface of a tire, and
wherein respective surfaces of the first sensor element and the second sensor element are exposed through the base of the housing material.

10. The tire monitoring system of claim 1, wherein the housing material defines a base adapted to provide an interface with an inside surface of a tire, and
wherein respective surfaces of the first sensor element and the second sensor element adjacent the base are covered by the housing material.

11. A method of providing a tire monitoring system, the method comprising:
providing a dielectric sensor substrate;
providing a first sensor element on the dielectric substrate;
providing a second sensor element on the dielectric substrate;
providing a circuit board including control circuitry coupled with at least one of the first sensor element and the second sensor element, the control circuitry being configured to generate tire tread information based on an electrical response of at least one of the first sensor element and the second sensor element, at least a portion of the dielectric sensor substrate being between the circuit board and at least one of the first sensor element and the second sensor element; and forming a housing on the circuit board using a housing material that surrounds the circuit board in a direction parallel with respect to a surface of the circuit board, the housing material and a material of the dielectric sensor substrate being different.

12. The method of claim 11, wherein the housing material comprises rubber.

13. The method of any of claim 11, wherein forming the housing comprises molding the housing material on and/or around the first sensor element, the second sensor element, and the circuit board.

14. The method of claim 13, wherein molding the housing material comprises injection molding the housing material.

15. The method of claim 11 further comprising:
providing a power source electrically coupled with the printed circuit board,
wherein forming the housing comprises forming the housing so that the housing material surrounds the power source in the direction parallel with respect to the surface of the board.

16. The method of claim 15, wherein the power source is at least one of:
between the circuit board and at least one of the first and second sensor elements; and
a battery.

17. The method of claim 11, wherein forming the housing comprises forming the housing so that the housing material defines a base adapted to provide an interface with an inside surface of a tire and so that respective surfaces of the first sensor element and the second sensor element are exposed through the base of the housing material.

18. The method of claim 11, wherein forming the housing comprises forming the housing so that the housing material defines a base adapted to provide an interface with an inside surface of a tire and so that respective surfaces of the first sensor element and the second sensor element adjacent the base are covered by the housing material.

19. The tire monitoring system of claim 1, wherein the tire tread information comprises at least one of:
a tire tread height; and
a tire tread wear.

20. A method of determining tire tread information, the method comprising:
determining, by a circuit board in a housing, an electrical response of at least one of a first sensor element and a second sensor element, the first sensor element and the second sensor element each being provided on a dielectric sensor substrate with at least a portion of the dielectric sensor substrate being between the circuit board and at least one of the first sensor element and the second sensor element, the housing including a housing material that surrounds the circuit board in a direction parallel with respect to a surface of the circuit board, the housing material being different than a material of the dielectric sensor substrate, and the housing material being molded on and/or around the first sensor element, the second sensor element, and the circuit board; and
generating, by the circuit board, tire tread information based on the electrical response.

* * * * *